May 2, 1944.  A. K. BRUMBAUGH  2,347,987
DUAL DRIVE AXLE
Filed Sept. 9, 1941  3 Sheets-Sheet 1

INVENTOR,
ANDREW K. BRUMBAUGH.
BY
Chas. E. Townsend.
ATTORNEY.

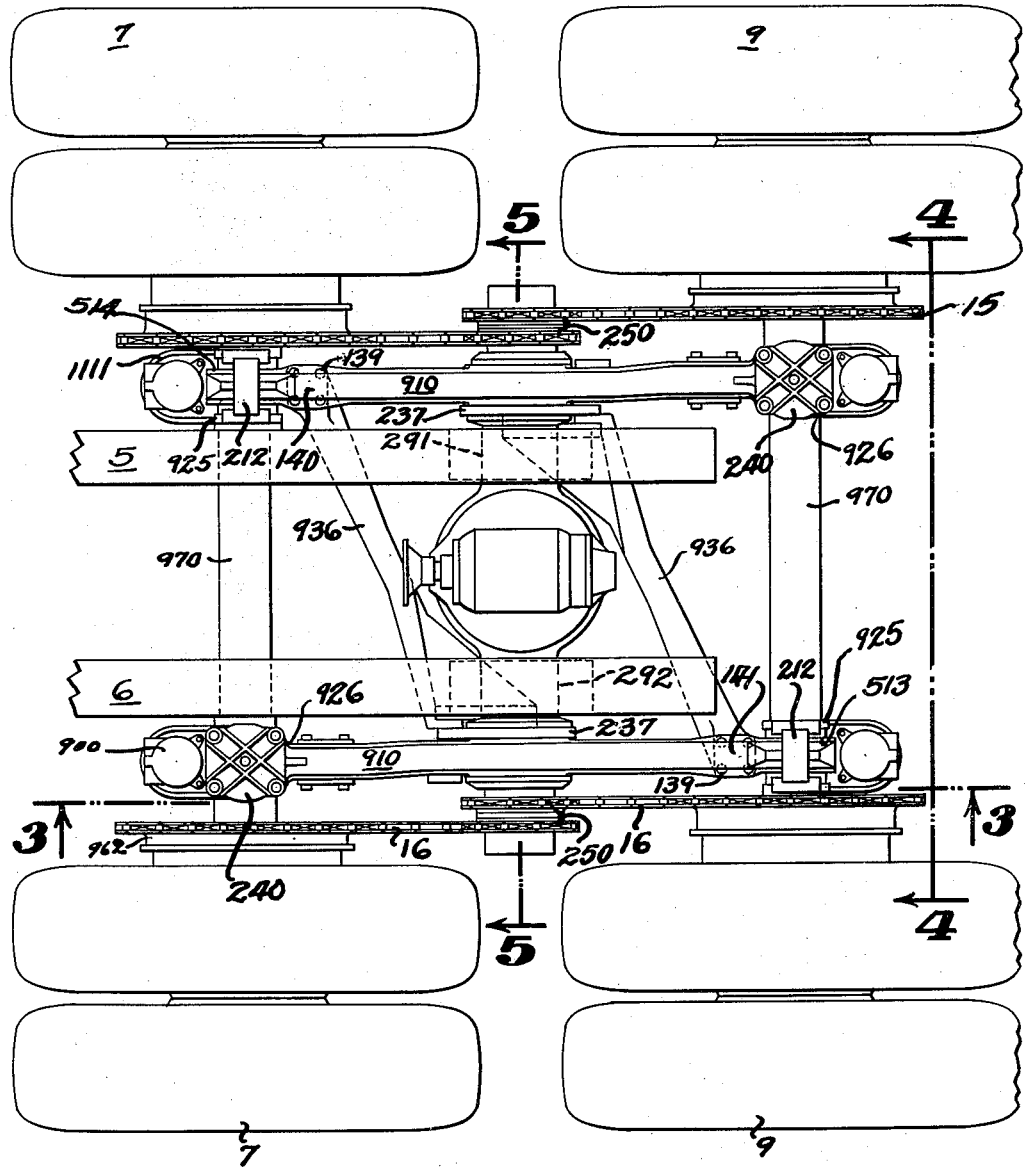

INVENTOR.
ANDREW K. BRUMBAUGH.
BY
Chas. E. Townsend
ATTORNEY.

Patented May 2, 1944

2,347,987

UNITED STATES PATENT OFFICE 2,347,987

DUAL DRIVE AXLE

Andrew K. Brumbaugh, Palo Alto, Calif., assignor, by mesne assignments, to Knuckey Truck Company, San Francisco, Calif., a copartnership composed of W. A. Knuckey and A. K. Brumbaugh Application September 9, 1941, Serial No. 410,145

15 Claims. (Cl. 180—22)

My invention relates to vehicle suspension systems, with particular reference to multi-wheeled units having center-pivoted rocking beams on each side mounting driving wheels in tandem propelled by dual drive axles.

Multi-wheeled trucks are widely used to permit carrying heavy loads without exceeding the permissible unit pressures on tires and highways. The problem of transmitting power to the individual driving wheels is difficult, as is that of distributing the load evenly between them.

One of the most satisfactory methods developed is to pivot centrally a rocking beam on each side of the chassis, mount wheels in tandem on each beam, and drive the tandem wheels together by chains carried over sprockets fixed to a common axle. The usual differential gearing is provided to drive the separate axles for each set of tandem wheels from the engine.

I have constructed units of this type to carry loads of forty tons or over at speeds of twenty-five miles per hour or above. These trucks were developed especially for large scale operations, such as the construction of dams and highways, in which the usual limitations as to width could be suspended. The pertinent dimensions will be given to show the relative magnitude and importance of some of the forces which the chassis must withstand.

The embodiment illustrated in the drawings has two front wheels, through which the vehicle is guided, and eight rear wheels propelling and supporting the load. Two rocking beams are journaled on opposite sides about a common axis at the rear of the vehicle. Axles parallel to the rocking beam axis join the front ends and the rear ends of the two beams non-rigidly together. A fore pair and an aft pair of dual wheels is mounted terminally of each rocking beam on these axles, although for lighter loads the outer wheel of each dual pair could be omitted. Tires of 13.50 x 24 inch size, or larger, are used, and the weight of the rear wheel assembly, including the rocking beams, is five tons. The tread width center-to-center of the outer wheels is one hundred fourteen inches, as compared with passenger car treads of fifty-six inches. The longitudinal wheel base from the front axle to the axis of the rocking beams is one hundred eighty-two inches, and the tandem wheel pairs are spaced sixty-three inches center-to-center.

The center-pivoted beam mounting is well known in the art and is advantageous in transmitting vertical displacements to the load only one-half as great as those experienced by the individual wheel and correspondingly reducing side sway and tilting. Even with this reduction in the relative movements produced by the forces encountered in the hauling, accelerations of eight to ten times gravity are commonly developed, and bearing failures and fractures in frame members, due to fatigue, have been very common in previous designs.

The prior art mountings are subject to a number of other disadvantages which my invention overcomes. One such is the tendency of the entire tandem unit to weave from side to side of the vehicle center line. The movement is usually abrupt, the unit snapping from one side to the other. Where relative transverse movement between masses in the entire unit is possible, these accelerations cause impact thrusts in the structure which are very harmful.

In the present invention there are positive transverse connections which avoid surge effects and the destructive impacts resulting. Further, the relations of all forces and masses have been worked out to minimize the relative accelerations.

Steering effects, due to the longitudinal spacing of the wheel pairs, can be resisted in prior suspensions only by the resistance to thrust of the rocking beam bearings, and there has been no solution to the resultant rapid bearing failure at these points prior to my invention. In my suspension these and other thrust loads applied to the beam ends are transmitted, through diagonal braces, to the opposite sides of the chassis and properly resisted, as will be further explained below.

As an illustration of prior art methods of preventing lateral displacement between load and the tandem wheels, consider the following: A thrust member is pin-connected to the front tandem axle, adjacent to the wheels on one side, and extends in the vertical plane of the axle diagonally upward and across to be pin-connected to the frame at the opposite side of the vehicle. A second thrust member is similarly connected on the opposite diagonal between the rear tandem axle and the frame. As the chassis undergoes vertical displacements on the road, the frame as a whole is prevented from shifting laterally by the opposing diagonal thrust members. However, each thrust member rocks through an arc about the pin connection to the axle as a center. The pin connection at the frame then tries to move in an arcuate path instead of vertically, imparting a lateral acceleration to the frame at that point. The frame connection points are longitudinally separated by the wheel base of the tandem unit, and as a result twisting and bending forces are set up in the side girders of the frame which have caused a large number of frame fractures at these points. In addition, as the frame members yield, the tandem wheels and chains are thrown out of alinement, and there is a continuous weaving set up which keeps the destructive forces at work whenever the truck is moving.

My invention opposes lateral displacements while positively relating the parts so that such accelerations are not set up. In my construction the rectangular parallelogram defined by the two tandem axles and the two rocking beams is always kept in alinement with the longitudinal axis of the vehicle, so that the forces produced by shifting the course of the vehicle or by irregularities in the roadbed are not permitted to interfere with the alinement of the wheels and chains. This requires that the beams be constrained to oscillation in a vertical plane only. The manner in which I maintain the vertical plane for oscillation of the beam will illustrate the way in which I relate forces and masses to minimize relative accelerations and stresses between the parts.

Assume that one of the tandem wheels is displaced vertically. The plane of the rectangular parallelogram defined as above is then warped. The side represented by the tandem axle moves arcuately about a center near the opposite end of the axle. The side represented by the beam moves arcuately about the center of the wheel at the beam end opposite to that displaced. These arcuate movements in perpendicular planes require an elongation both of the beam and of the axle if their connection is to be maintained while the beam end continues to rock in the desired plane, and the axle is held normal to the vehicle centerline.

My invention accomplishes these aims by the form of the connection between the beams and the axles. Each beam has a cylindrical engaging surface formed longitudinally at one end which rests in a coaxial mating surface on the axle. This allows the axle to rock freely, in a plane normal to the longitudinal axis of the vehicle, about the center of the engaging surfaces. As the axle rocks, a wear plate at its opposite end slides laterally beneath a spherical engaging surface formed on the end of the other beam. Hence tilting the axle introduces no lateral thrusts, beyond the frictional resistance of the engaging surfaces, which would tend to force the rocking beam out of its proper vertical plane of oscillation.

As the axle tilts, the beam rocks in an arc about the point of contact between the spherical engaging surface at its end opposite to the cylindrical engaging surfaces and the associated axle wear plate. Sliding movement between the cylindrical engaging surfaces, parallel to the vehicle axis, is simultaneously permitted.

If necessary, the spherical engaging surface can also slide on the wear plate, so that displacement of a wheel vertically causes no stresses due to the distortion of the supporting parallelogram in the side beam. These connections permit a great degree of flexibility in the vertical movement of the individual wheels without setting up unnecessary destructive stresses in the various parts.

Lateral deflections of the beams, caused by steering and other forces developed in the conventional tandem frame, are prevented in my invention by the use of diagonal thrust members. A thrust member, as said above, is rigidly secured to one end of each beam and extends diagonally to the opposite side of the frame, where the thrust is taken by a plate journaled about the pivotal mounting of the beams. The diagonal member rocks with the beam and permits the beam journals to carry radial loads only. This separation of radial and thrust loads on the beam journals cures one of the worst faults of pivoted side beam mountings.

Other problems encountered with center-pivoted tandem mountings include that of resisting the couple developed whenever the brakes are applied which tends to "roll up" the wheel about its axle, the adjustment for wear in the chains on the individual wheel sprockets, and the transmission of driving and braking thrusts between the beams and wheels. The problems are met by using radius rods, adjustable in length, connected by vertical pivots to the axle and by ball joints to the hubs of the rocking beams beneath the beam axes.

It will thus be seen that the primary object of my invention is to produce an improved suspension system for vehicles using center-pivoted side beams secured to a plurality of wheels in tandem. An additional object is to minimize accelerations within supporting structures by proper relations between masses and forces. A further object of my invention is to increase the efficiency of large automotive hauling units; another is to eliminate bearing failure in multi-wheel suspensions; another is to separate the radial and thrust loads between a rocking beam and its pivotal support; a corresponding object is to prevent overloading of the bearings on a center-pivoted rocking beam; yet another object is to reduce mechanical failures in heavy duty trucking operations; and still another object is to increase the rapidity of operation possible in heavy hauling.

These and other objects will appear to those skilled in the art from the following illustration and description of a preferred embodiment of my invention. It will be obvious from such a study that certain structural modifications may be made and the principles applied to other embodiments without departing from the spirit of my invention as expressed in the claims.

In the drawings:

Fig. 2 is a fragmentary top plan view of the center pivot tandem drive of the truck illustrated in Fig. 1;

Figure 1:
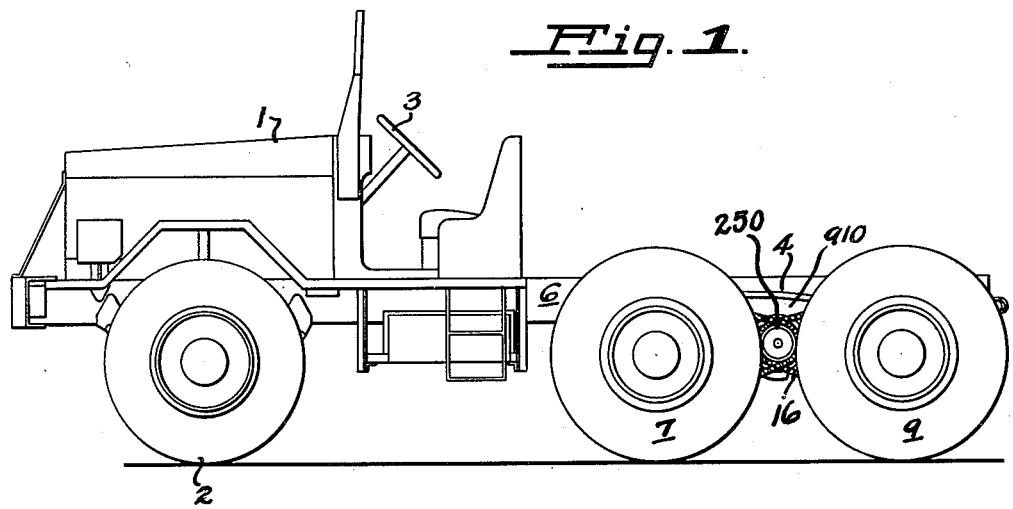
Fig. 1 is a side elevation of a heavy duty truck embodying my invention, the truck body being omitted for clarity.

In Fig. 1 is illustrated a multi-wheeled truck, generally indicated as 1, incorporating my improvements. Vehicle 1 is steered through front wheels 2 by conventional steering means actuated by a steering wheel 3. At the rear a multi-wheel driving and supporting wheel assembly 4 is shown. A differential and jack shaft housing 91 is rigidly secured to right and left frame channels 5 and 6 by jack shaft trunnions 291 and 292.

Figure 5:
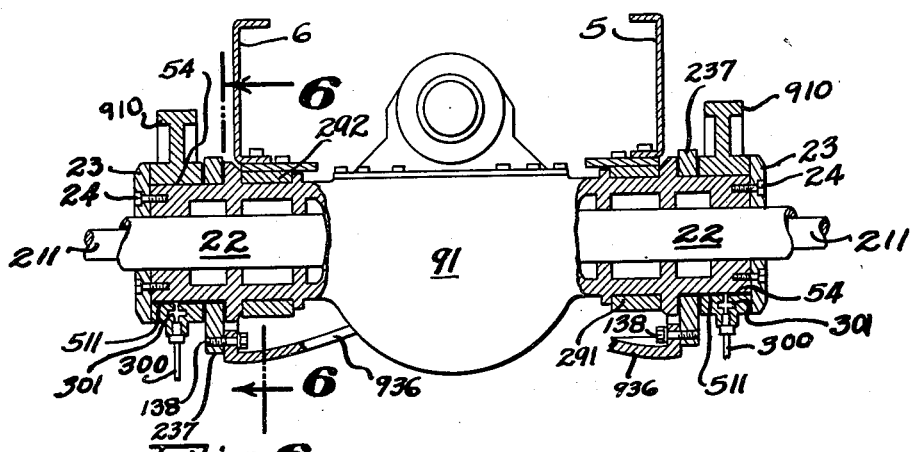
Fig. 5 is a fragmentary view, partially in section, taken as indicated by line 5—5 in Fig. 2, to show details of the rocking beam journal mounting.

Outside the frame members 5 and 6, bearing surfaces 54, formed on the jackshaft housing 91, receive rockably bores 511 formed centrally through side beams 910. Side beams 910 are held on the jackshaft engaging surfaces 54 by end plates 23, secured terminally, as by bolts 24, to the jackshaft housing 91. Side beams 910 are free to oscillate in a vertical plane parallel to the main center line of the vehicle 1. They distribute the vehicle load between fore and aft axles and maintain this distribution, through oscillation, when the vehicle passes over irregular surfaces. This movement is restricted to a vertical plane by cross rods 936, fixed by bolts 139 to the fore end 140 of one beam 910 and to the aft end 141 of the opposite beam 910. Cross rods 936 extend diagonally across the vehicle beneath side beams 910 and are secured at the opposite sides of the chassis to cross rod thrust plates 237 by bolts 138 (Fig. 5).

The cross rod thrust plates 237 are journaled about the jackshaft engaging or bearing surface 54 immediately adjacent to the opposite side beam 910 and thus rock with the cross rod about the same center line as the beam to which the rod is attached. Hence a thrust tending to produce lateral deflection of side beam aft end 141, for example, is transmitted in any rocked position of the beam by cross rod 936 to the jackshaft housing at the opposite side of the vehicle instead of being resisted only by the jackshaft bearing surface on which the beam is carried.

Figure 7:
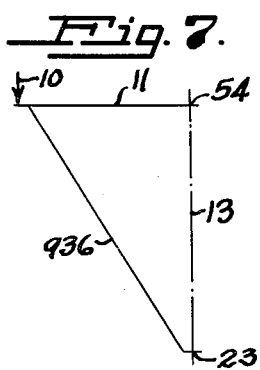
Fig. 7 is a diagrammatic view, illustrating the application of thrust forces to a side beam in the instant embodiment.
Figure 8:
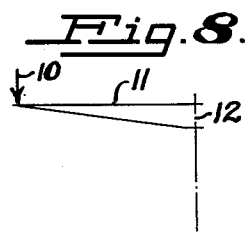
Fig. 8 is a diagrammatic view, illustrating the application of thrust forces to a conventional type of side beam.

This advantage is illustrated diagrammatically in Figs. 7 and 8. A thrust 10 applied transversely to the beam end acts through a lever of length 11, and is resisted in Fig. 8, by forces acting through a maximum lever length 12, representing the width of the bearing at the beam center in a conventional design. Obviously, the thrust will produce great unit stresses at the bearing, since the diameter, as well as the axial length thereof, is limited by other design factors.

In Fig. 7 the resisting lever length 13 of my design extends from the beam bearing 54 to the opposite thrust plate 237, so that the stresses in the bearing surfaces at 54 and 237 will be substantially reduced, eliminating bearing failure and maintaining the alinement of the tandem wheels and chain drives.

Figure 4:
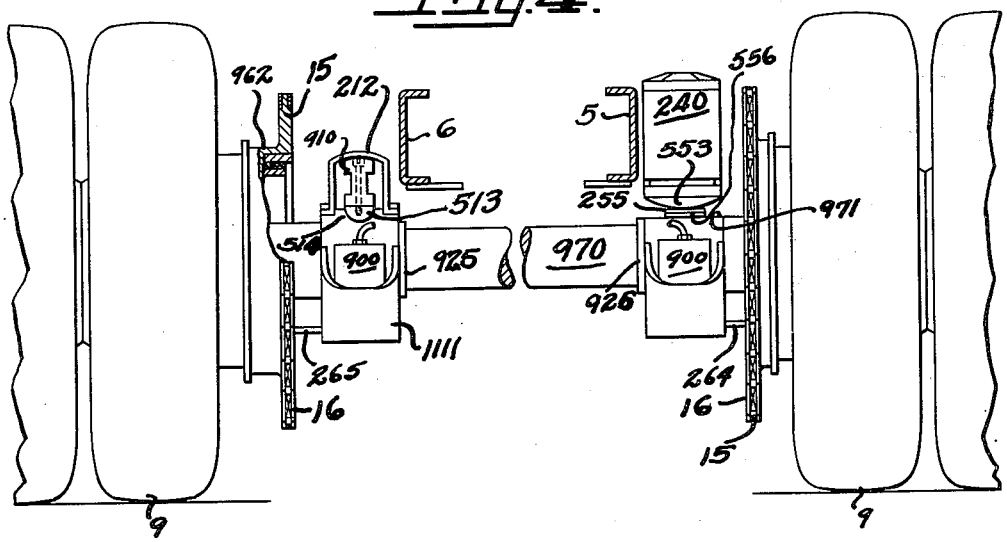
Fig. 4 is a schematic rear view of the tandem wheel mounting, looking in the direction indicated by arrows 4—4 in Fig. 2.

Side beams 910 rest on the fore and aft axle beams 970 through a wear block 513 at one end, and a spherical engaging surface 553 at the opposite end. The beam wear block 513, seen to best advantage in Fig. 4, has a cylindrical surface with its axis parallel to the major axis of the beam and the vehicle. The block is fixed to the end of the beam adjacent to the point of attachment of cross rod 936 and mates with a corresponding axle beam wear block 514, formed on a brake spider 925 fixedly mounted on the axle beam 970.

At the opposite side of the chassis a flat wear pad 971 is formed on the brake spider 926 journaled about axle beam 970 through a bushing 972. On the pad 971 there rests slidably a leaf spring wear plate 556, secured beneath a leaf spring 255. Leaf spring 255 is shackled loosely to side beam 910 by a leaf spring pin 158, as shown in detail in Fig. 3, and is engaged slidably, in turn, by a spherical spring case inner end 553. An outer spring case 240 is formed integrally with side beam 910. Within it slides a spring inner case 254, on which is formed the spring case inner end 553. Within inner spring case 254 is compressively held a spring 260, which resiliently supports the loaded beam 910.

It will appear from this construction that any variation of the longitudinal separation between the axis of the beam 910 and the point of engagement on the axle beam wear pad 971 will be permitted without interfering with the support by the axle of the rocking beam. Further, when the axle beam 970 tilts in a plane transverse to the center line of the vehicle the spherical surface 553 will maintain proper contact without introducing twisting stresses between the beam and the axle housing. By using the spring member 255 it is possible to introduce sufficient resiliency in the replaceable wearing surfaces to compensate for any twisting action without destroying the flatness of the contact surface beneath the spherical member 553.

At the end opposite that enclosing the coil spring 260, complete freedom for tilting in a transverse plane of the axle beam 970 is obtained by the cylindrical wear pad 513, described above, which at the same time prevents lateral displacement of the axle beam 970 relative to the side beam 910. In order to prevent the cylindrical wear block 513 from jumping out of its mating surface 514 when passing over unusual irregularities in the road, I secure a beam strap 212 to the brake spider 925 and extending over the beam end 141. During the normal progress of the vehicle, beam strap 212 is not in contact with the beam end, or engages very lightly therewith, but will prevent the beam end from jumping out of its engagement if a vertical displacement should occur.

No restriction is placed by the beam wear block 513 to longitudinal displacements between the beam 910 and the axle beam 970, beyond that of sliding friction. It will be apparent from this construction that the axle beams 970 and the side beams 910 are free to rock in their respective vertical planes without introducing torsion between the members. It will be clear that the side beams are prevented, by the diagonal thrust members 936, from moving out of their vertical plane during rocking movements. Complete freedom is thus permitted in responding to road irregularities while maintaining the proper alinement of the driving chains with the wheels.

Figure 3:
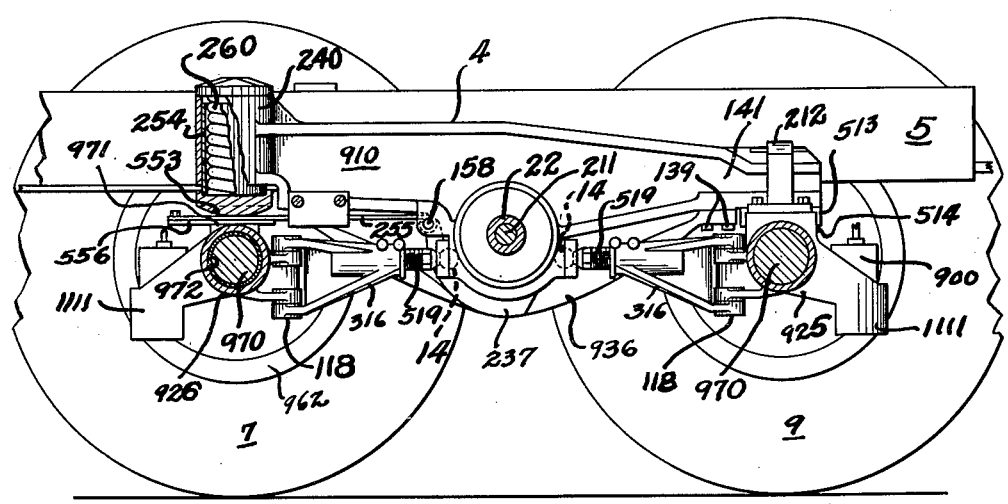
Fig. 3 is a side view, partially in section, of the multi-wheel drive unit, taken along the line 3—3 of Fig. 2.

In Fig. 3 I have shown the details of the radius rods 316 which prevent the wheels from winding up about the axles when braking forces are applied and which maintain the alinement of the axle beams 970 normal to the center line of the vehicle, regardless of their angle of tilt. Each of the radius rods 316 is connected by a ball and socket joint 14 to the central hub portion of beam 910 beneath the rocking axis thereof. At its end opposite ball joint 14, each rod is connected through a vertical radius rod pin 118 to axle beam 970 through brake spider 925 or 926. The radius rod is arranged for threadable adjustment of length to compensate for chain wear by means of radius rod adjusting screw 519.

It will be seen that this construction permits the radius rods to shift laterally about the ball joints 14 and the pin connections 118 to accommodate the angular displacement resulting from a vertical displacement of the individual wheel, while at the same time maintaining the alinement of the axle beams 970 and transmitting the longitudinal thrusts between the jackshaft housing 91 and the wheels 7 and 9. The radius rods 316 also constitute part of a quadrilateral which resists the couples produced when braking forces are applied to the wheels.

The fixed spider 925 constitutes a rigid anchor for the torque resisting parallelogram of which the radius rod 316 is a part, and of which the side beam 910 forms the remainder.

In the drawings, I have illustrated the brakes schematically as enclosed within brake drums 962 and actuated through right-and-left brake cam shafts 264 and 265 from hydraulic brake cylinders 900, mounted in brake cylinder housing studs 1111 formed integrally with brake spiders 925 and 926 disposed about axle beams 970 in alinement with each end of each side beam 910. The brake cylinders 900 are actuated by conventional hydraulic pressure means not shown in the drawings.

Figure 6:
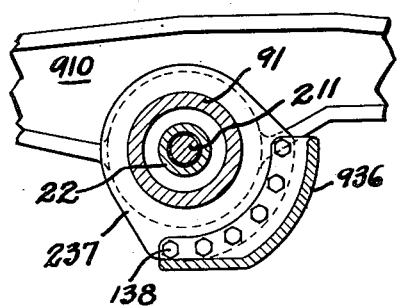
Fig. 6 is a fragmentary side view, partially in section, taken as indicated by line 6—6 in Fig. 5, to show details of the rocking beam mounting.

The construction of the braking means within the brake drums 962 is wholly conventional and forms no part of the present invention. The brake drums themselves, however, carry sprockets 15, over which chains 16 are meshed to transmit the driving force to the wheels from hub sprockets 250, rotating about the axis of jackshaft housing 91. The exact manner in which power is transmitted through the jackshaft housing 91 to the wheels is illustrated in Figs. 2, 5, and 6.

Within jackshaft housing 91 the jackshaft tubes 22 are fixed, through which dual driving axles 211 extend rotatably. The sprockets 250 are secured to the dual drive shafts 211 and are held to rotation about the axis of jackshaft housing 91 by conventional bearings not shown in the drawings. Thus the jackshaft assembly supports the driving axles in a fixed position relative to the frame, and the bearings referred to transmit the longitudinal thrusts of driving.

It will be observed that the center-to-center distance between the driving sprockets 15 at the individual wheels and the hub driving sprockets 250 is held to a fixed dimension by the radius rods 316 and the various connections described above, regardless of the amount of vertical displacement experienced. As long as these center-to-center distances can be maintained substantially identical and the longitudinal alinement of the hub sprockets 250 and the corresponding wheel sprockets 15 maintained, chain failure is reduced to a minimum. It will be noted that the adjustment for chain wear provided by the radius rod adjusting screw 519 does not throw the axle beams 970 out of their proper relation to the vehicle center line as long as substantially equal degrees of wear are experienced on both sides of the vehicle, and that the adjustment is permitted by the form of the connections between the axle beams and the side beams without introducing any stresses therebetween.

Lubrication of the side beams 910 at their bearing surfaces 511 is accomplished through the flexible conduit 300, fed under pressure by a source not shown and communicating through lubricating bores 301 with the bearing surfaces 511.

I prefer to provide an intermittent feed under pressure through the flexible conduit 300, so that the bearing surfaces 54 will be supplied with oil at all times, regardless of the presence or absence of rocking motion of the beam about the jackshaft housing. For example, I have found it satisfactory to energize the pressure feed system at intervals determined by the distance traveled by the vehicle, and I utilize a pressure sufficiently high to force the loaded jackshaft bearing surfaces 511 out of contact with the bearing surfaces 54 at their bottom portions sufficiently to permit flow of oil under pressure throughout the entire bearing area. At the same time this oil is permitted to flow between the cross rod thrust plate 237 and the beam, as well as between the thrust plate 237 and the jackshaft bearing surface 54. It is not difficult to provide lubrication between the thrust plate 237 and the jackshaft housing 91, since thrusts are applied to this plate in opposite directions continually throughout movement of the vehicle. These alternately directed thrusts cause sufficient clearance about the thrust plate to enable the oil to flow between the relatively moving surfaces.

It will be appreciated that in running over level road, the side beams might not rock sufficiently for an extended period to permit the maintenance of an oil film between the bearing surfaces 54 and 511, if it were not for the use of the pressure feed system briefly described above.

In summary, I have provided a dual drive axle arrangement for transmitting power to tandem-mounted multiple wheels carried by center pivoted rocking beams particularly suited to heavy-duty vehicle construction. I have provided means to constrain each of the side beams to rocking motion in a plane perpendicular to the center line of the vehicle, thereby eliminating one of the most fruitful sources of trouble and wear in the operation of chain drive vehicles. I accomplish this by transmitting lateral thrusts applied to the transverse axles, and through them to the beams, to the thrust bearings at the opposite side of the vehicle. This allows the beam center bearings to handle radial loads only and relieves them of the necessity for simultaneously carrying the side thrusts against the beams. Complete freedom of movement within the multi-wheel supporting structure is allowed for vertical displacement of the wheels when road irregularities are encountered without introduced strains tending to warp the plane defined by the supporting axles and side beams in a manner producing bending and torsional stresses between the parts.

The construction which I have set forth also provides means for resisting couples on the wheels, due to braking forces, without setting up objectionable forces which have been experienced with prior structures in the art. Finally, I have so related the forces and masses operating between the chassis and the wheel assembly that lateral freedom is reduced to a point where impact and fatigue effects no longer subject the parts to forces which can not be counteracted. My construction reduces frame breakage and wear on the driving mechanism to a minimum and offers a substantial economic saving in the maintenance of heavy duty units.

While a sufficient amount of relative sliding movement is permitted between the member 553 and the wear pad 971, other elements of the construction which are connected to such member 553 and wear pad 971 will limit such sliding movement to prevent the member from sliding off of the end of the wear pad.

While I have described my invention in an embodiment particularly developed for heavy duty service, it will be obvious that the principles involved and the type of suspension used could be applied to any sized vehicle as desired. It will also be obvious that my suspension system can be applied to units driven from the front instead of the rear or to those utilizing both front and rear drive.

What I claim is:

1. In a multi-wheel vehicle using pivoted side beams carried on wheels arranged in tandem, means for constraining said beams to oscillation in a vertical plane parallel to the center line of said vehicle, comprising thrust rods each secured terminally to said beams and extending diagonally from its respective beam to the side of said vehicle opposite thereto, and thrust plates at said opposite sides and disposed rockably about the pivotal axes of said beams and secured to said rods.

2. In a multi-wheeled vehicle having center-pivoted beams mounting transverse axles carrying driving wheels in tandem, means for constraining said beams to rocking in a vertical plane, comprising a diagonal thrust member fixed terminally of each of said beams and rockably secured relative to the pivotal axis of said beams at the opposite side of said vehicle.

3. A center-pivoted side beam suspension for a multi-wheeled vehicle, comprising a jackshaft housing secured to said vehicle, a pair of side beams journaled about said housing for rocking about an axis normal to the center line of said vehicle, axle beams disposed transversely beneath said beams at the fore and aft ends thereof, thrust plates journaled about said jackshaft housing adjacent to each of said beams, and a thrust rod secured to each of said thrust plates and extending diagonally into rigid terminal engagement with the opposite one of said beams.

4. A suspension system for multi-wheel vehicles, comprising side beams pivotally secured to the chassis of said vehicle, transverse axles connected terminally to said side beams, wheels connected to said axles, means for allowing tilting of said axles relative to said beams, and means for resisting lateral thrust against said beams comprising a member disposed at the side of said chassis opposite the beam to which said thrust is applied.

5. A suspension system for a multi-wheel driving unit secured by center pivoted side beams to a vehicle chassis, comprising axle beams disposed fore and aft beneath and transversely of said side beams, a connection between one end of each of said side beams and the axle beam therebeneath permitting only rocking of said axle beam about an axis parallel to the centerline of said vehicle and sliding movement along said axis, and means for transmitting lateral thrusts against said side beam adjacent said connection directly to the opposite side of said chassis adjacent the central portion of the side beam pivotally there disposed.

6. A suspension system for a multi-wheel driving unit secured by center pivoted side beams to a vehicle chassis, comprising cylindrical wear pads fixed beneath opposite ends of said side beams parallel to the longitudinal axis of said chassis, spherical engaging surfaces fixed beneath the end of each side beam opposite said cylindrical wear pads, axle beams disposed transversely at the fore and aft ends of said side beams, wheels mounted thereon in tandem, cylindrical wear pads formed at one side of each of said axle beams and engaging said side beam cylindrical wear pads, a wear pad disposed at the opposite side of each of said axle beams supporting said spherical engaging surface, means for transmitting thrusts parallel to the axis of said chassis between said axle beams and the central portion of said side beams and for resisting couples due to braking and propelling forces on said wheels, and means for transmitting lateral thrusts diagonally from an end of each of said side beams to the opposite side of said chassis.

7. In a suspension system for a vehicle having a plurality of driving wheels tandem mounted on centrally pivoted side beams, the combination of fore and aft axle beams disposed normal to the center line of said vehicle beneath said side beams, individual wheel driving means operable through the central portion of each of said side beams, and means for permitting rocking of said side beams in planes parallel to the vehicle centerline only without moving said axle beams out of normality to said centerline, comprising a housing fixed transversely to the chassis of said vehicle, journals formed thereon rockably to receive said side beams, a spherical and a semi-cylindrical engaging surface axially parallel to the vehicle centerline formed beneath opposite ends of each of said beams; a flat wear plate formed at one end of each of said axle beams, a semi-cylindrical wear plate formed at the opposite end in axial normality to each of said axle beams, said semi-cylindrical side beam and axle beam surfaces being arranged to mate, and said spherical side beam engaging surfaces being arranged for sliding and rolling contact with said flat axle beam wear plate; and means for transmitting longitudinal forces directly between said axle beams and the central portions of said side beams.

8. In a suspension system for a vehicle having a plurality of driving wheels tandem mounted on centrally pivoted side beams, the combination of fore and aft axle beams disposed normal to the center line of said vehicle beneath said side beams, individual wheel driving means operable through the central portion of each of said side beams, means for permitting rocking of said side beams in planes parallel to the vehicle centerline only without moving said axle beams out of normality to said centerline, comprising a housing fixed transversely to the chassis of said vehicle, journals formed thereon rockably to receive said side beams, a spherical and a semi-cylindrical engaging surface axially parallel to the vehicle centerline formed beneath opposite ends of each of said beams; a flat wear plate formed at one end of each of said axle beams, a semi-cylindrical wear plate formed at the opposite end in axial normality to each of said axle beams, said semi-cylindrical side beam and axle beam surfaces being arranged to mate, and said spherical side beam engaging surfaces being arranged for sliding and rolling contact with said flat axle beam wear plate; thrust plates rotatably mounted on said housing journals, a thrust member rigidly secured to one end of each of said side beams and extending diagonally across said chassis into rigid connection with the opposite one of said thrust plates, and means for transmitting longitudinal forces directly between said axle beams and the central portions of said side beams.

9. In a suspension system for a vehicle having a plurality of driving wheels tandem mounted on centrally pivoted side beams, the combination of fore and aft axle beams disposed normal to the center line of said vehicle beneath said side beams, individual wheel driving means operable through the central portion of each of said side beams, means for permitting rocking of said side beams in planes parallel to the vehicle centerline only without moving said axle beams out of normality to said centerline, comprising a housing fixed transversely to the chassis of said vehicle, journals formed thereon rockably to receive said side beams, a spherical and a semi-cylindrical engaging surface axially parallel to the vehicle centerline formed beneath opposite ends of each of said beams; a flat wear plate formed at one end of each of said axle beams, a semi-cylindrical wear plate formed at the opposite end in axial normality to each of said axle beams, said semi-cylindrical side beam and axle beam surfaces being arranged to mate, and said spherical side beam engaging surfaces being arranged for sliding and rolling contact with said flat axle beam wear plate; thrust plates rotatably mounted on said housing journals, a thrust member rigidly secured to one end of each of said side beams and extending diagonally across said chassis into rigid connection with the opposite one of said thrust plates, and radius rods substantially parallel to the vehicle centerline disposed between each end of said axle beams and the central portion of said side beams.

10. In a suspension system for a vehicle having a plurality of driving wheels tandem mounted on centrally pivoted side beams, the combination of fore and aft axle beams disposed normal to the center line of said vehicle beneath said side beams, individual wheel driving means operable through the central portion of each of said side beams, means for permitting rocking of said side beams in planes parallel to the vehicle centerline only without moving said axle beams out of normality to said centerline, comprising a housing fixed transversely to the chassis of said vehicle, journals formed thereon rockably to receive said side beams, a spherical and a semi-cylindrical engaging surface axially parallel to the vehicle centerline formed beneath opposite ends of each of said beams; a flat wear plate formed at one end of each of said axle beams, a semi-cylindrical wear plate formed at the opposite end in axial normality to each of said axle beams, said semi-cylindrical side beam and axle beam surfaces being arranged to mate, and said spherical side beam engaging surfaces being arranged for sliding and rolling contact with said flat axle beam wear plate; thrust plates rotatably mounted on said housing journals, a thrust member rigidly secured to one end of each of said side beams and extending diagonally across said chassis into rigid connection with the opposite one of said thrust plates, radius rods connected to each end of each of said axle beams by a vertical pivot, ball and socket joints connecting said radius rods to the central portions of said side beams, and means for varying the length of said radius rods.

11. In a vehicle suspension utilizing a plurality of wheels mounted at the corners of structural elements defined by a rectangular parallelogram disposed symmetrically about the vehicle center line and connected to said vehicle by pivotal means along the transverse centerline of said parallelogram, means for permitting separate vertical displacement of the corners of said parallelogram without distortion of the horizontal projection thereof and without introducing torsional stresses between the normally adjacent sides, and means extending from opposite corners of said parallelogram diagonally into rocking engagement about the transverse centerline thereof at the opposite side of said parallelogram.

12. In vehicle suspension utilizing parallel axle beams mounting wheels in tandem through center pivoted rigid side beams, a torque transfer system comprising longitudinally slidable connections between said axle beams and said side beams above the pivotal axis thereof, torque rods connected pivotally to each end of said axle beams and universally to the central portions of said side beams beneath the pivotal axis thereof, and means for varying the center-to-center distance between said axle beams and the pivotal axis of said side beams.

13. In a multi-wheeled vehicle having center pivoted side beams, a beam suspension system including means for transmitting lateral thrusts applied terminally against said side beams directly to the opposite side of said vehicle and slide means to permit relative lateral motion between the ends of said beams.

14. A multi-wheeled vehicle having center-pivoted side beams, driving wheels fore and aft of the center pivot, a jackshaft housing, and a beam extending laterally beyond both sides of said housing to distribute thrusts applied to a wheel on one side of said housing laterally across said vehicle to bypass said housing.

15. A vehicle having longitudinal frame members, transverse axle beams, a sliding connection between a member and a beam to permit of relative horizontal movement therebetween, and means to limit said relative sliding movement to maintain the connection, said last mentioned means comprising another connection between said member and said beam.

ANDREW K. BRUMBAUGH.